(12) United States Patent
Yamamoto

(10) Patent No.: US 9,300,830 B2
(45) Date of Patent: Mar. 29, 2016

(54) INFORMATION PROCESSING APPARATUS, IMAGE READING SYSTEM, AND COMPUTER-READABLE MEDIUM

(71) Applicant: FUJI XEROX CO., LTD, Minato-ku, Tokyo (JP)

(72) Inventor: Norio Yamamoto, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/472,463

(22) Filed: Aug. 29, 2014

(65) Prior Publication Data

US 2015/0281496 A1 Oct. 1, 2015

(30) Foreign Application Priority Data

Mar. 26, 2014 (JP) ................................. 2014-064806

(51) Int. Cl.
*H04N 1/00* (2006.01)
(52) U.S. Cl.
CPC ....... *H04N 1/00875* (2013.01); *H04N 1/00854* (2013.01); *H04N 1/00925* (2013.01)
(58) Field of Classification Search
USPC ....................................................... 358/1.15
See application file for complete search history.

(56) References Cited

U.S. PATENT DOCUMENTS 7,082,555 B2 * 7/2006 Toyooka et al. ................ 714/48
2008/0252922 A1 * 10/2008 Ikegami ................ H04L 63/083
358/1.15
2010/0263044 A1 * 10/2010 Yamada ................ G06F 3/1222
726/17
2011/0173686 A1 * 7/2011 Ueno ................ H04N 1/00204
726/6
2014/0279516 A1 * 9/2014 Rellas ................ G06Q 30/0185
705/44

FOREIGN PATENT DOCUMENTS

JP 3904008 B2 4/2007

OTHER PUBLICATIONS

Sutcu et al., A Secure Biometric Authentication Scheme Based on Robust Hashing, Aug. 2005, ACM Paper, MM-SEC'05 , all pages.*

* cited by examiner

*Primary Examiner* — Ngon Nguyen
(74) *Attorney, Agent, or Firm* — Sughrue Mion, PLLC

(57) ABSTRACT

An information processing apparatus includes a first-information acquiring section, a transmitting section, a second-information acquiring section, and a storage. The first-information acquiring section acquires first image information which is read by a reading apparatus. In response to the first image information which is acquired by the first-information acquiring section and which indicates that the reading apparatus is permitted to perform a reading operation, the transmitting section transmits instruction information to the reading apparatus. The instruction information indicates that the reading apparatus be permitted to perform the reading operation. The second-information acquiring section acquires second image information which is read by the reading apparatus in accordance with the instruction information. The storage stores the second image information in association with the first image information.

13 Claims, 15 Drawing Sheets

FIG. 5

| USER DATA | USER FEATURE VALUE | | USER IMAGE DATA C |
|---|---|---|---|
| USER ID | ENTIRE USER FEATURE VALUE A | PARTIAL USER FEATURE VALUE B | |
| 000001 | A1 | B1 | C1 |
| 000002 | A2 | B2 | C2 |
| 000003 | A3 | B3 | C3 |
| ...... | ...... | ...... | ...... |

FIG. 6

| RESERVATION DATA | | | | |
|---|---|---|---|---|
| RESERVATION NUMBER | USER ID | EXCLUSIVE-USE INSTRUCTION | | REMAINING TIME |
| | | USER FEATURE VALUE | | |
| | | ENTIRE USER FEATURE VALUE A | PARTIAL USER FEATURE VALUE B | |
| 1 | 000001 | A1 | B1 | X:XX |
| 2 | 000003 | A3 | B3 | Y:YY |

INFORMATION PROCESSING APPARATUS, IMAGE READING SYSTEM, AND COMPUTER-READABLE MEDIUM

CROSS-REFERENCE TO RELATED APPLICATIONS

This application is based on and claims priority under 35 USC 119 from Japanese Patent Application No. 2014-064806 filed Mar. 26, 2014.

BACKGROUND

Technical Field

The present invention relates to an information processing apparatus, an image reading system, and a computer-readable medium.

SUMMARY

According to an aspect of the present invention, there is provided an information processing apparatus including a first-information acquiring section, a transmitting section, a second-information acquiring section, and a storage. The first-information acquiring section acquires first image information which is read by a reading apparatus. In response to the first image information which is acquired by the first-information acquiring section and which indicates that the reading apparatus is permitted to perform a reading operation, the transmitting section transmits instruction information to the reading apparatus. The instruction information indicates that the reading apparatus be permitted to perform the reading operation. The second-information acquiring section acquires second image information which is read by the reading apparatus in accordance with the instruction information. The storage stores the second image information in association with the first image information.

BRIEF DESCRIPTION OF THE DRAWINGS

Exemplary embodiments of the present invention will be described in detail based on the following figures, wherein:

FIG. 5 is a diagram for describing an exemplary configuration of user data stored in a user-data storage unit;

FIG. 6 is a diagram for describing an exemplary configuration of reservation data stored in a reservation storage unit;

DETAILED DESCRIPTION

Exemplary embodiments of the present invention will be described below in detail with reference to the attached drawings.

First Exemplary Embodiment

Figure 1:
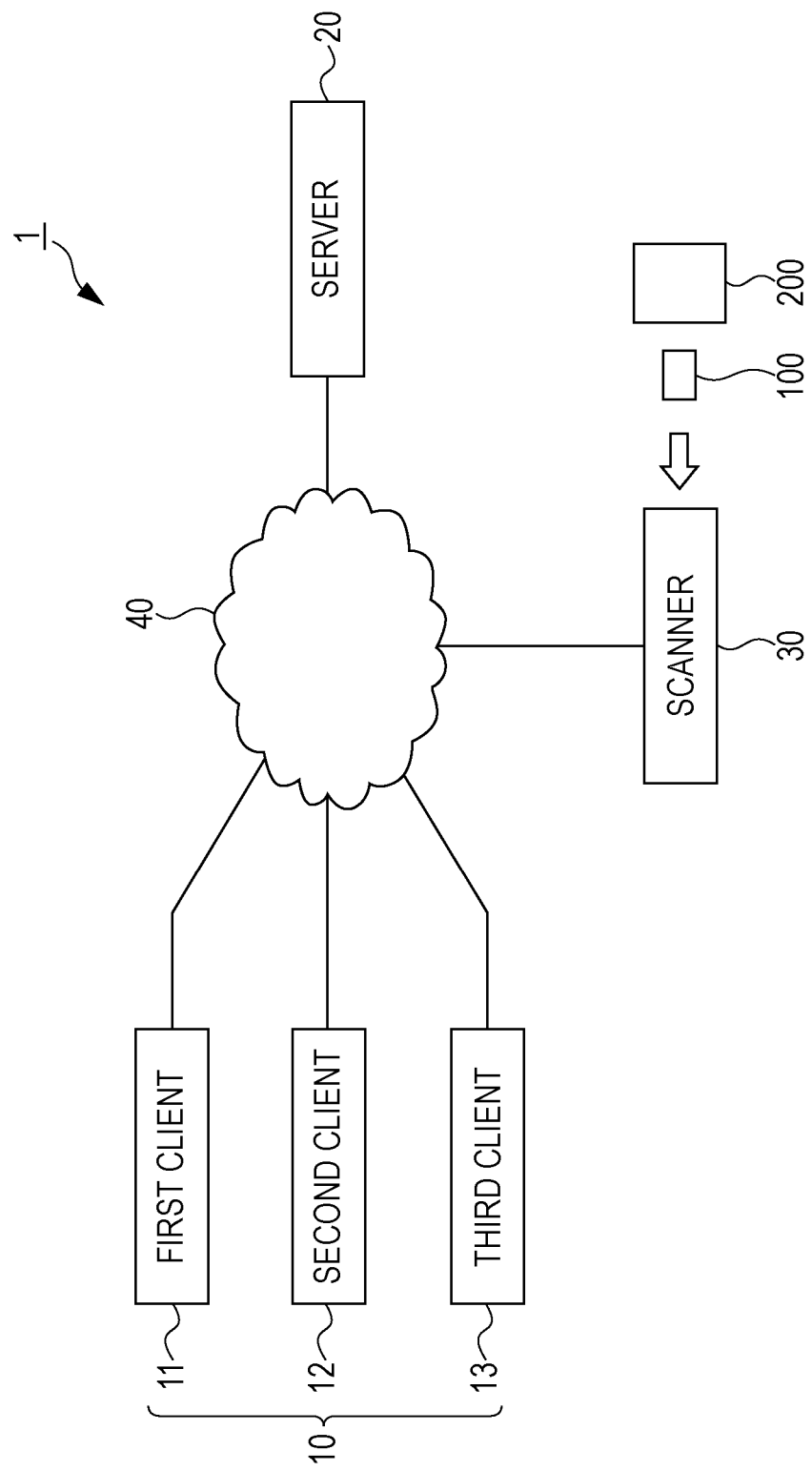
FIG. 1 is a diagram illustrating an exemplary overall configuration of a scan service system to which an exemplary embodiment is applied.

FIG. 1 is a diagram illustrating an exemplary overall configuration of a scan service system 1 to which a first exemplary embodiment is applied.

The scan service system 1 has a configuration in which a client group 10 including a first client 11, a second client 12, and a third client 13, a server 20, and a scanner 30 are connected to each other via a network 40.

In the scan service system 1, multiple users share one scanner 30 via the client group 10. In the scan service system 1, image data (hereinafter referred to as document image data) obtained by each user using the scanner 30 to read a document 200 is stored in the server 20 in such a manner that the image data is associated with the user. In the scan service system 1, the server 20 manages document image data for each of the users. In the scan service system 1, when a user wants to use the scanner 30 to read the document 200, the user exclusively uses the scanner 30 via the client group 10 and the server 20. In the scan service system 1, when a user is to exclusively use the scanner 30, authentication is performed on the basis of image data (hereinafter referred to as authentication image data) obtained by reading an authentication card 100 carried by the user by using the scanner 30. In this example, the authentication image data serves as first image information, and the document image data serves as second image information.

Each of the first client 11 to the third client 13 which constitute the client group 10 is constituted by a computer, such as a desktop computer, a notebook computer, a tablet computer, or a smartphone. Each of the computers constituting the client group 10 has a web browser for viewing web pages. In this example, three clients constitute the client group 10. However, the number of clients is not limited to this. Multiple users may share one client.

The server 20 is also constituted by a computer. The server 20 according to the first exemplary embodiment has a function of storing the document image data obtained by using the scanner 30 to read the document 200, for each of the users, as described above.

The scanner 30 serving as an exemplary reading apparatus or an exemplary reading section reads an image formed on the authentication card 100 or the document 200 which is the target to be read. Examples of a method of reading an image by using the scanner 30 include a method in which an image is read while the target to be read stands still, and a method in which an image is read while the target to be read is being transported.

Figure 2:
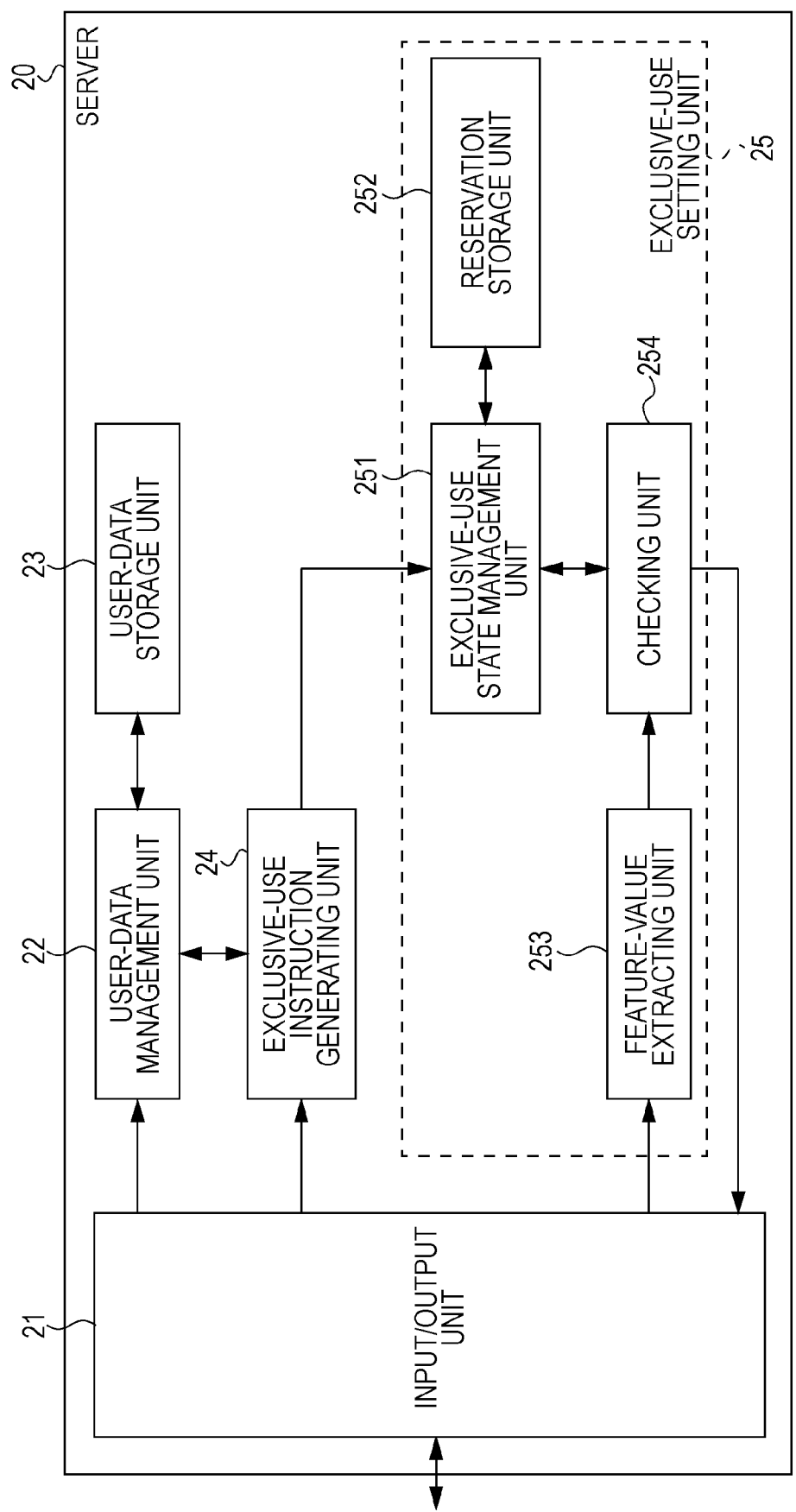
FIG. 2 is a diagram for describing an exemplary configuration of a server according to a first exemplary embodiment.

FIG. 2 is a diagram for describing an exemplary configuration of the server 20 according to the first exemplary embodiment.

The server 20 according to the first exemplary embodiment includes an input/output unit 21 which inputs/outputs various types of data between the network 40 (see FIG. 1) and the server 20, a user-data management unit 22 which manages data (hereinafter referred to as user data) which is set for each of the users, a user-data storage unit 23 which stores the user data, an exclusive-use instruction generating unit 24 which generates an exclusive-use instruction on the basis of a request for exclusive use (request for use) of the scanner 30 which is transmitted by a user from one of the clients constituting the client group 10, and an exclusive-use setting unit 25 which performs exclusive-use setting (reservation for use) of the scanner 30 on the basis of the exclusive-use instruction generated by the exclusive-use instruction generating unit 24. The user data stored in the user-data storage unit 23 includes a feature value (hereinafter referred to as a user feature value) obtained by performing a known process of extracting a feature value, on the authentication image data obtained by reading the authentication card 100 carried by each of the users who use the scan service system 1 according to the first exemplary embodiment. The details about this will be described below. The exclusive-use instruction generated by the exclusive-use instruction generating unit 24 also includes the user feature value corresponding to a user who has transmitted a request for exclusive use. Examples of a feature value include a value which is mathematically calculated from the authentication image data, and a value calculated from character information on an image for authentication. The feature value may be obtained by combining these calculated values.

In the first exemplary embodiment, the input/output unit 21 has functions as an exemplary first-information acquiring section, an exemplary second-information acquiring section, and an exemplary transmitting section. The user-data storage unit 23 has a function as an exemplary user-data storage.

In the first exemplary embodiment, the exclusive-use setting unit 25 included in the server 20 includes an exclusive-use state management unit 251 which manages an exclusive-use state of the scanner 30 on the basis of the exclusive-use instruction transmitted from the exclusive-use instruction generating unit 24, a reservation storage unit 252 which stores the exclusive-use instruction for the scanner 30 as reservation data, a feature-value extracting unit 253 which extracts a feature value (hereinafter referred to as a read feature value) by performing image processing on the authentication image data transmitted from the scanner 30, and a checking unit 254 which checks the read feature value (exemplary image feature value information) extracted by the feature-value extracting unit 253 against the user feature value corresponding to a user who has transmitted an exclusive-use instruction.

In the first exemplary embodiment, the exclusive-use state management unit 251 has a function as an exemplary reserving section. The feature-value extracting unit 253 has a function as an exemplary feature-value extracting section. In the first exemplary embodiment, the checking unit 254 has functions as an exemplary determination section, an exemplary checking section, and an exemplary prohibiting section.

Figure 3:
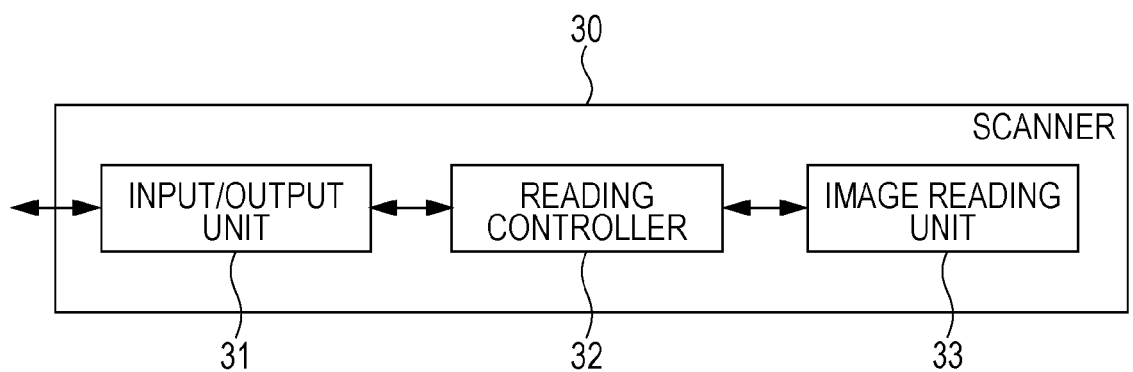
FIG. 3 is a diagram for describing an exemplary configuration of a scanner according to the first exemplary embodiment.

FIG. 3 is a diagram for describing an exemplary configuration of the scanner 30 according to the first exemplary embodiment.

The scanner 30 according to the first exemplary embodiment includes an input/output unit 31 that inputs/outputs various types of data between the network 40 (see FIG. 1) and the scanner 30, a reading controller 32 that controls an image reading operation, and an image reading unit 33 that reads an image of a target which is to be read, such as the authentication card 100 (see FIG. 1) or the document 200 (see FIG. 1).

Figure 4:
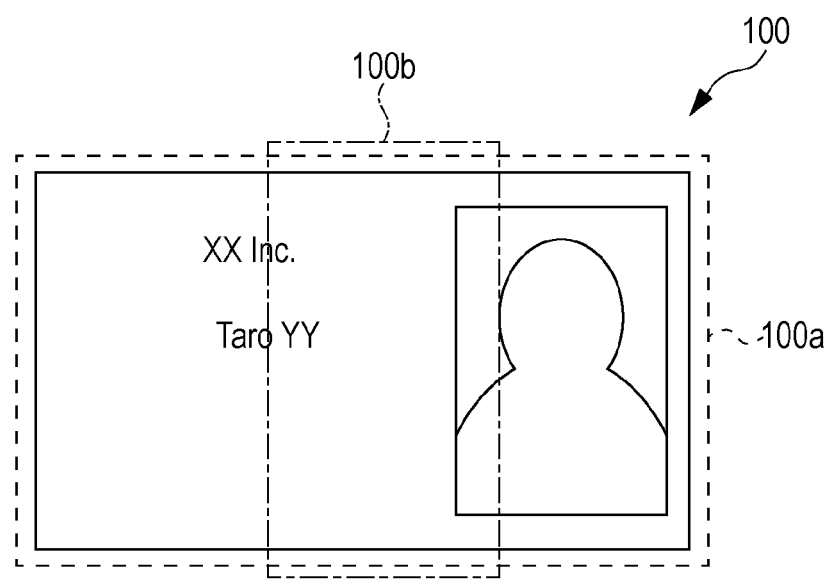
FIG. 4 is a diagram illustrating an exemplary authentication card.

FIG. 4 is a diagram illustrating an exemplary authentication card 100 serving as an exemplary medium for identification. In this example, an employee ID card on which a photograph of a user's face is printed is illustrated as the authentication card 100. On the authentication card 100, the company name (XX Inc.) and the user name (Taro YY) are described on the left side of the figure, and a photograph of the user's face is printed on the right side of the figure. When an employee ID card or the like is used as the authentication card 100, electronic information may be added to the authentication card 100 by using an integrated circuit (IC) chip embedded in the authentication card 100, or magnetic information may be added by using a magnetic tape provided for the authentication card 100.

FIG. 4 illustrates an entire area 100a including the entire surface of the authentication card 100 and a specified area 100b including a part of the area (a central portion in this example) of the authentication card 100. In the description below, a feature value extracted from data which is read from the entire area 100a of the authentication card 100 is called an entire feature value. A feature value extracted from data which is read from the specified area 100b of the authentication card 100 is called a partial feature value. The user feature value described above includes an entire feature value (hereinafter referred to as an entire user feature value A) and a partial feature value (hereinafter referred to as a partial user feature value B). The read feature value described above also includes an entire feature value (hereinafter referred to as an entire read feature value a) and a partial feature value (hereinafter referred to as a partial read feature value b).

FIG. 5 is a diagram for describing an exemplary configuration of the user data stored in the user-data storage unit 23 (See FIG. 2).

In the first exemplary embodiment, the user data is data in which a user identification (ID) as exemplary user identification information which is given to each of the users, the user feature value (the entire user feature value A and the partial user feature value B) as exemplary user feature value information which is obtained by reading the authentication card 100 carried by the user in advance, and the user image data C including the document image data which is obtained in such a manner that the user uses the scanner 30 to read the document 200 are associated with each other.

In the example illustrated in FIG. 5, the user ID "000001" is assigned to the owner (Taro YY in XX Inc.) of the authentication card 100 illustrated in FIG. 4. Thus, the entire user feature value A1 corresponding to the user ID "000001" is based on the reading result of the entire area 100a of the authentication card 100 illustrated in FIG. 4. The partial user feature value B1 corresponding to the user ID "000001" is based on the reading result of the specified area 100b of the authentication card 100 illustrated in FIG. 4. FIG. 5 illustrates user data for three users (user IDs "000001" to "000003"). Actually, the number of pieces of user data matches the number of users who use the service.

FIG. 6 is a diagram for describing an exemplary configuration of reservation data stored in the reservation storage unit 252 (see FIG. 2).

In the first exemplary embodiment, the reservation data is data in which a reservation number, an exclusive-use instruction, and a remaining time are associated with each other. The exclusive-use instruction has a data configuration in which the user ID of a user who has transmitted a request for exclusive use is associated with the user feature value (the entire user feature value A and the partial user feature value B) corresponding to the user ID. The remaining time is a time with which countdown is started at the time when the reservation is registered in the reservation storage unit 252. When the remaining time reaches 0:00, the reservation of the corresponding reservation number is deleted.

In the example illustrated in FIG. 6, two reservations for the user IDs "000001" and "000003" are set. The number of reservations which may be received is not limited to two, and may be one or more than two.

Figure 7:
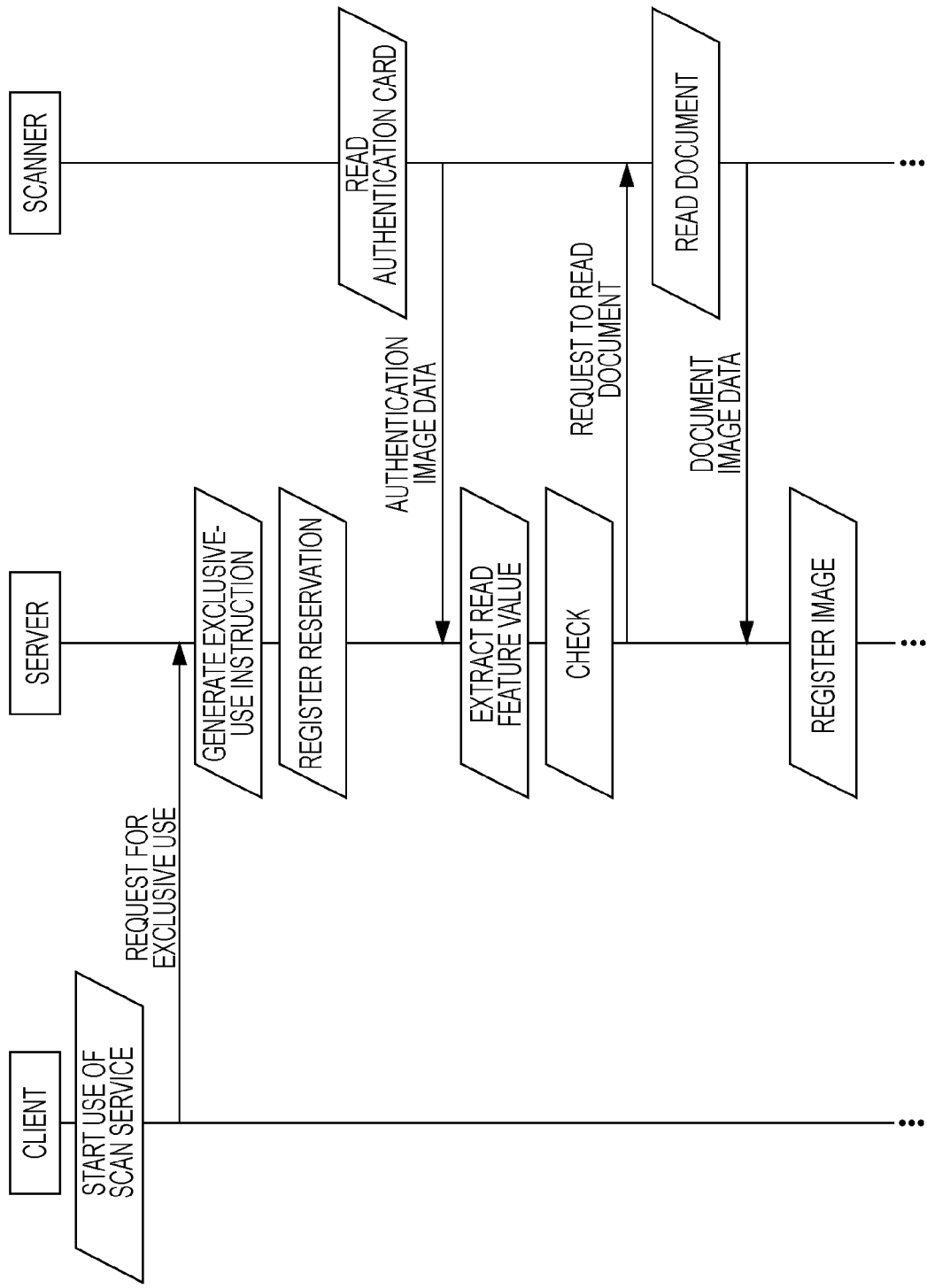
FIG. 7 is a sequence chart for describing an exemplary first operation in the scan service system according to the first exemplary embodiment.

FIG. 7 is a sequence chart for describing an exemplary first operation in the scan service system 1 according to the first exemplary embodiment. FIG. 7 illustrates a case in which a user who has made a reservation by transmitting a request for exclusive use uses the scanner 30 before a timeout occurs in a timer using the remaining time.

In one of the clients constituting the client group 10, a user opens a web browser corresponding to the scan service, thereby starting use of the scan service. Then, the user transmits a request for exclusive use of the scanner 30 on the web browser, whereby the request for exclusive use is output from the client to the server 20. The request for exclusive use includes the user ID of the user who has transmitted the request.

In the server 20, the exclusive-use instruction generating unit 24 receives the request for exclusive use via the input/output unit 21. Then, the exclusive-use instruction generating unit 24 obtains the user ID included in the received request for exclusive use, and transmits the obtained user ID to the user-data management unit 22. The user-data management unit 22 refers to the user data stored in the user-data storage unit 23, and reads out the user feature value (the entire user feature value A and the partial user feature value B) corresponding to the user ID. The user-data management unit 22 transmits the user feature value corresponding to the user ID, back to the exclusive-use instruction generating unit 24. The exclusive-use instruction generating unit 24 generates an exclusive-use instruction in which the user ID included in the request for exclusive use is associated with the user feature value received from the user-data management unit 22, and outputs it to the exclusive-use setting unit 25.

In the exclusive-use setting unit 25, the exclusive-use state management unit 251 which receives the exclusive-use instruction registers the exclusive-use instruction as reservation data in the reservation storage unit 252, and starts countdown of the remaining time by using a timer.

The user who has transmitted the exclusive-use instruction via the client goes to the scanner 30, sets the authentication card 100 carried by the user himself/herself, on the image reading unit 33, and makes the image reading unit 33 read an image. The authentication image data obtained by reading the authentication card 100 is output via the reading controller 32 and the input/output unit 31 from the scanner 30 to the server 20.

In the server 20, the feature-value extracting unit 253 included in the exclusive-use setting unit 25 receives the authentication image data via the input/output unit 21. The feature-value extracting unit 253 extracts a feature value from the received authentication image data, and obtains a read feature value including an entire read feature value a based on the entire area 100a and a partial read feature value b based on the specified area 100b. The feature-value extracting unit 253 transmits the obtained read feature value to the checking unit 254.

The checking unit 254 transmits an inquiry to the exclusive-use state management unit 251. The exclusive-use state management unit 251 transmits reservation data stored in the reservation storage unit 252 back to the checking unit 254. The checking unit 254 checks the read feature value received from the feature-value extracting unit 253 against the reservation data (user feature values) received from the exclusive-use state management unit 251, and determines whether or not a user feature value matches the read feature value.

If a user feature value in the reservation data matches the read feature value, the checking unit 254 outputs a request to read a document which is exemplary instruction information, via the input/output unit 21 from the server 20 to the scanner 30.

In the scanner 30, the reading controller 32 receives the request to read a document through the input/output unit 31. The reading controller 32 which receives the request to read a document permits the user reading of the document 200. The user sets the document 200 on the image reading unit 33, and makes the image reading unit 33 read an image. The document image data thus obtained by reading the document 200 is output via the reading controller 32 and the input/output unit 31 from the scanner 30 to the server 20.

In the server 20, the user-data management unit 22 receives the document image data via the input/output unit 21. The user-data management unit 22 registers (stores) the received document image data as the user image data C in the user-data storage unit 23 in such a manner that the document image data is associated with the corresponding user ID, and the series of processes end.

In this example, the user-data storage unit 23 stores the user image data C, as it is, in such a manner that the user image data is associated with a user ID. This exemplary embodiment is not seen to be limiting. For example, in the case where a configuration is employed in which the user image data C is stored in a data server (not illustrated) provided outside the server 20, the user-data storage unit 23 may register the uniform resource locator (URL) of the data server in which the user image data C is stored in such a manner as to be associated with a user ID.

Figure 8:
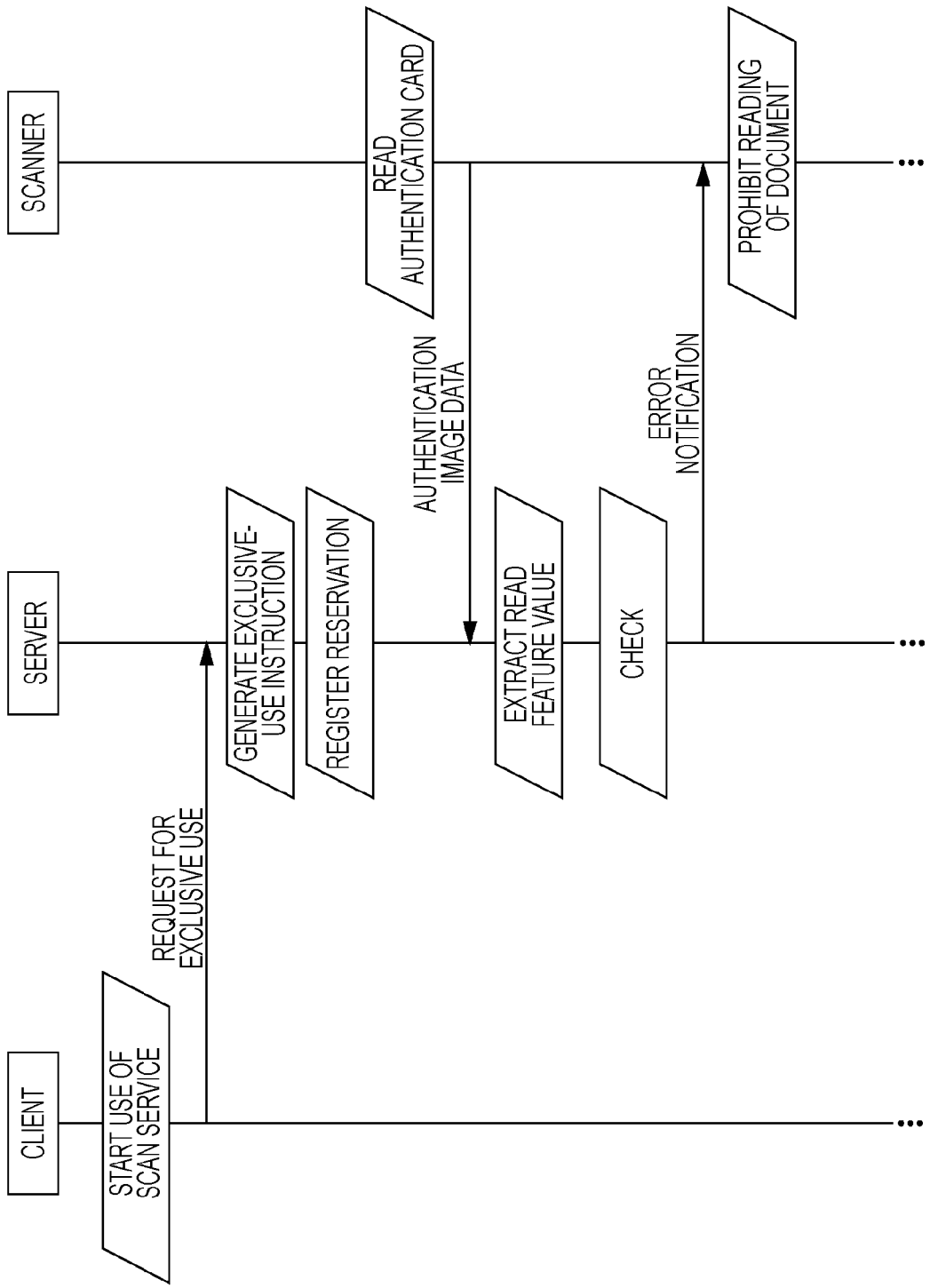
FIG. 8 is a sequence chart for describing an exemplary second operation in the scan service system according to the first exemplary embodiment.

FIG. 8 is a sequence chart for describing an exemplary second operation in the scan service system 1 according to the first exemplary embodiment. FIG. 8 illustrates a case in which a user who has not made a reservation by transmitting a request for exclusive use, or whose reservation made by transmitting a request for exclusive use has been released due to a timeout uses the scanner 30. In the example illustrated in FIG. 8, the procedure until the server 20 performs checking is the same as that in the example illustrated in FIG. 7. Therefore, the detail of the procedure will not be described.

If no user feature values in the reservation data match the read feature value, the checking unit 254 outputs an error notification via the input/output unit 21 from the server 20 to the scanner 30.

In the scanner 30, the reading controller 32 receives the error notification via the input/output unit 31. The reading controller 32 which receives the error notification prohibits the user from using the image reading unit 33 to read the document 200, and the series of processes end.

Second Exemplary Embodiment

In the first exemplary embodiment, the server 20 has a function of setting exclusive-use of the scanner 30. In a second exemplary embodiment, the scanner 30 itself has a function of setting exclusive-use of the scanner 30. In the second exemplary embodiment, components similar to those in the first exemplary embodiment are designated with identical reference numerals, and will not be described in detail.

Figure 9:
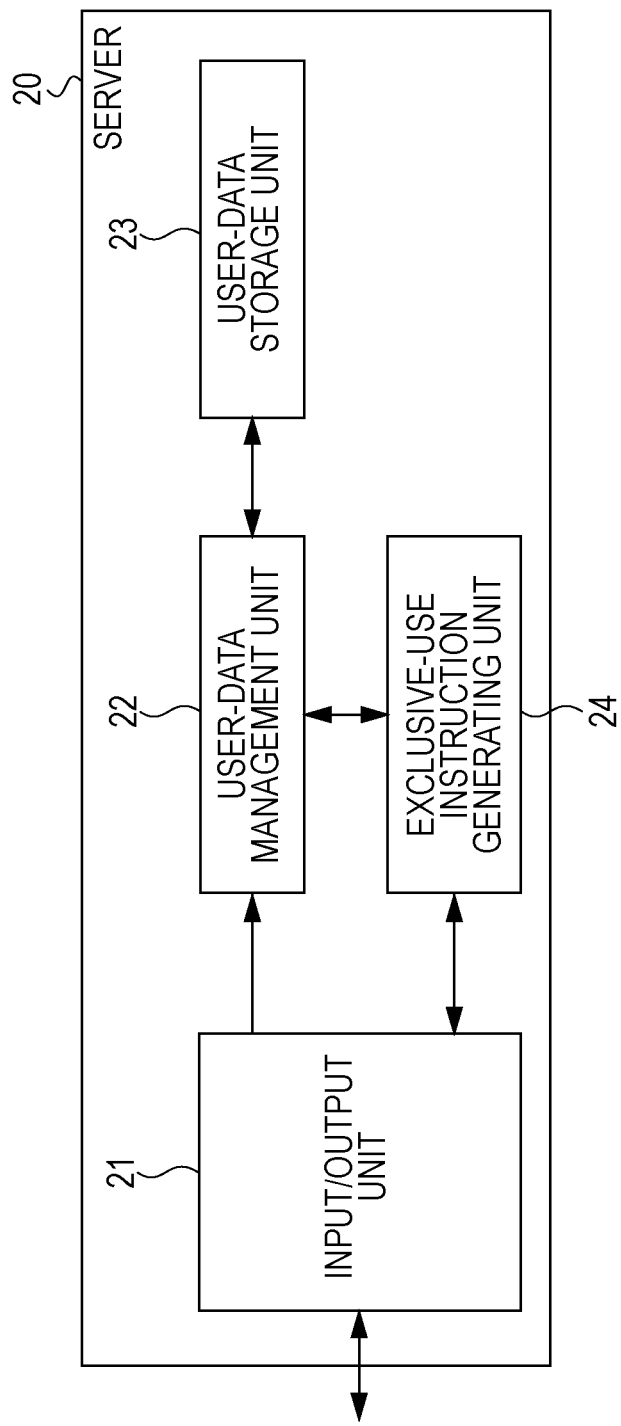
FIG. 9 is a diagram for describing an exemplary configuration of a server according to a second exemplary embodiment.

FIG. 9 is a diagram for describing an exemplary configuration of the server 20 according to the second exemplary embodiment.

The server 20 according to the second exemplary embodiment includes the input/output unit 21, the user-data management unit 22, the user-data storage unit 23, and the exclusive-use instruction generating unit 24.

Figure 10:
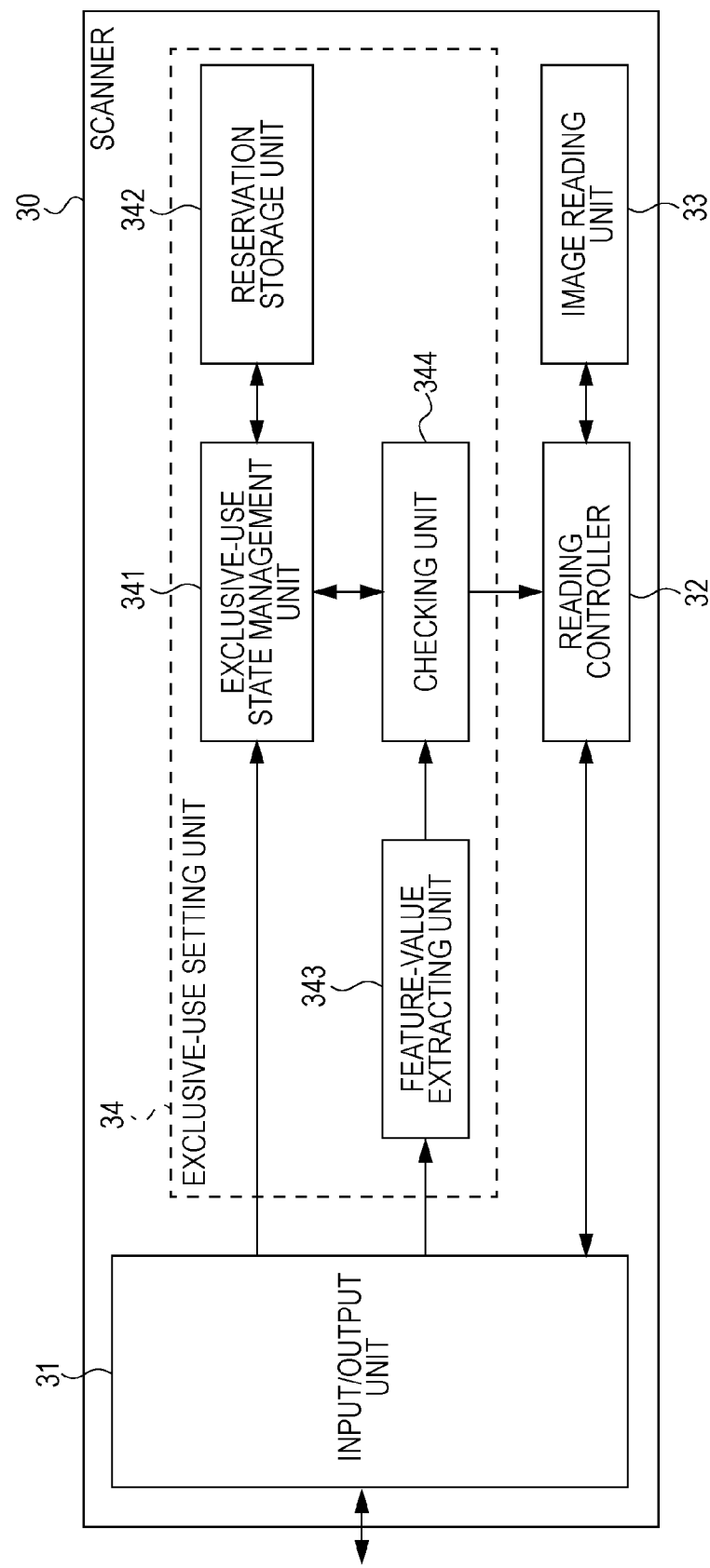
FIG. 10 is a diagram for describing an exemplary configuration of a scanner according to the second exemplary embodiment.

FIG. 10 is a diagram for describing an exemplary configuration of the scanner 30 according to the second exemplary embodiment.

The scanner 30 according to the second exemplary embodiment includes the input/output unit 31, the reading controller 32, the image reading unit 33, and an exclusive-use setting unit 34.

In the second exemplary embodiment, the exclusive-use setting unit 34 included in the scanner 30 includes an exclusive-use state management unit 341, a reservation storage unit 342, a feature-value extracting unit 343, and a checking unit 344. Each of the functions of the exclusive-use state management unit 341 to the checking unit 344 is similar to a corresponding one of the functions of the exclusive-use state management unit 251 to the checking unit 254 in the first exemplary embodiment.

Figure 11:
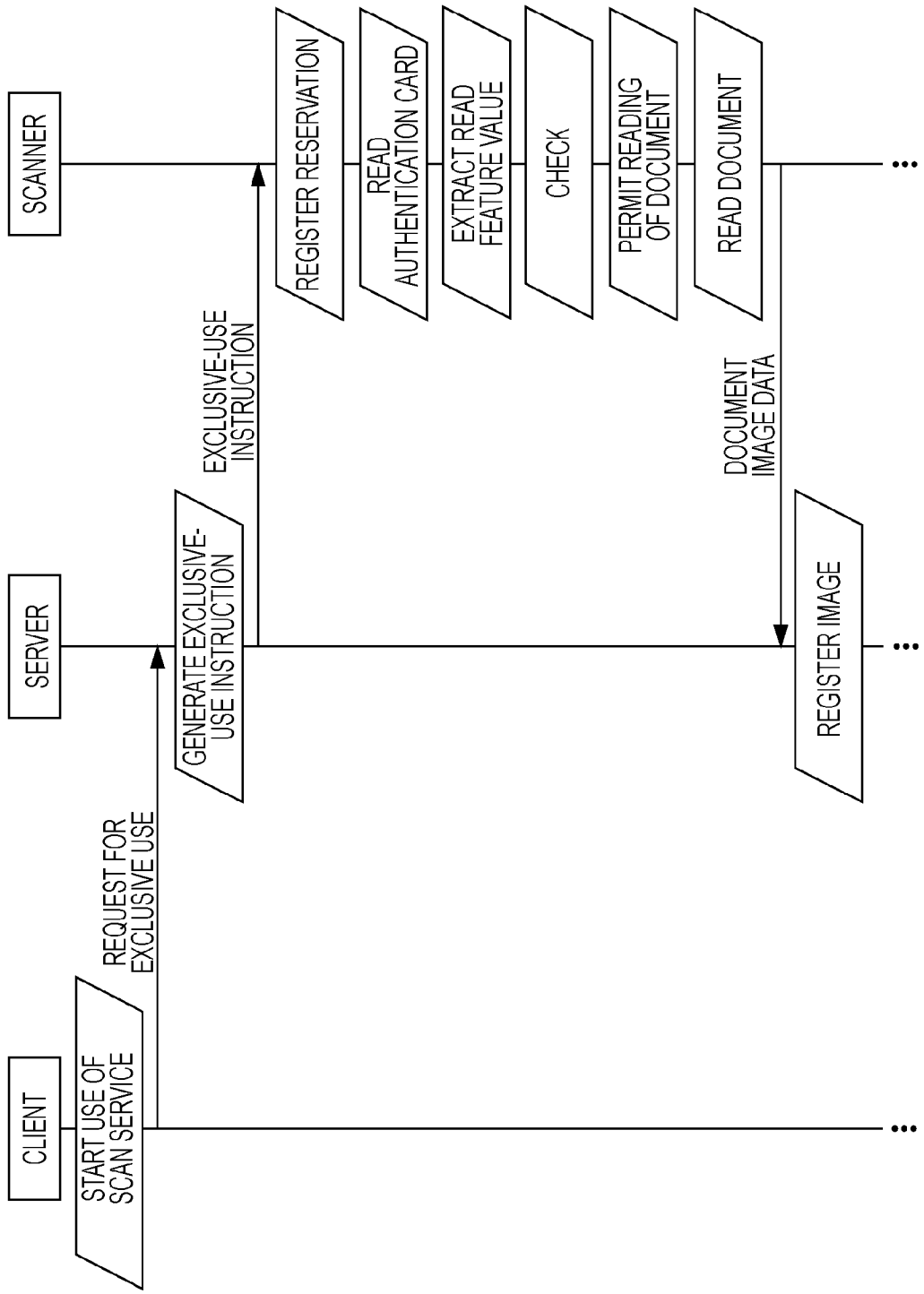
FIG. 11 is a sequence chart for describing an exemplary first operation in the scan service system according to the second exemplary embodiment.

FIG. 11 is a sequence chart for describing an exemplary first operation in the scan service system 1 according to the second exemplary embodiment. FIG. 11 illustrates a case in which a user who has made a reservation by transmitting a request for exclusive use uses the scanner 30 before a timeout occurs in a timer using the remaining time.

In one of the clients constituting the client group 10, a user opens a web browser corresponding to the scan service, thereby starting use of the scan service. Then, the user transmits a request for exclusive use of the scanner 30 on the web browser, whereby the request for exclusive use is output from the client to the server 20. The request for exclusive use includes the user ID of the user who has transmitted the request.

In the server 20, the exclusive-use instruction generating unit 24 receives the request for exclusive use via the input/output unit 21. Then, the exclusive-use instruction generating unit 24 obtains the user ID included in the received request for exclusive use, and transmits the obtained user ID to the user-data management unit 22. The user-data management unit 22 refers to the user data stored in the user-data storage unit 23, and reads out the user feature value (the entire user feature value A and the partial user feature value B) corresponding to the user ID. The user-data management unit 22 transmits the user feature value corresponding to the user ID, back to the exclusive-use instruction generating unit 24. The exclusive-use instruction generating unit 24 generates an exclusive-use instruction in which the user ID included in the request for exclusive use is associated with the user feature value received from the user-data management unit 22, and outputs it via the input/output unit 21 from the server 20 to the scanner 30.

In the scanner 30, the exclusive-use state management unit 341 included in the exclusive-use setting unit 34 receives the exclusive-use instruction via the input/output unit 31. The exclusive-use state management unit 341 registers the exclusive-use instruction as reservation data in the reservation storage unit 342, and starts countdown of the remaining time by using a timer.

The user who has transmitted the exclusive-use instruction via the client goes to the scanner 30, sets the authentication card 100 carried by the user himself/herself, on the image reading unit 33, and makes the image reading unit 33 read an image. The authentication image data obtained by reading the authentication card 100 is transmitted through the reading controller 32 and the input/output unit 31 to the exclusive-use setting unit 34. In the scanner 30, the feature-value extracting unit 343 included in the exclusive-use setting unit 34 receives the authentication image data. The feature-value extracting unit 343 extracts a feature value from the received authentication image data, and obtains a read feature value including an entire read feature value a based on the entire area 100a and a partial read feature value b based on the specified area 100b. The feature-value extracting unit 343 transmits the obtained read feature value to the checking unit 344.

The checking unit 344 transmits an inquiry to the exclusive-use state management unit 341. The exclusive-use state management unit 341 transmits reservation data stored in the reservation storage unit 342 back to the checking unit 344. The checking unit 344 checks the read feature value received from the feature-value extracting unit 343 against the reservation data (user feature values) received from the exclusive-use state management unit 341, and determines whether or not a user feature value matches the read feature value.

If a user feature value in the reservation data matches the read feature value, the checking unit 344 outputs a request to read a document, to the reading controller 32. The reading controller 32 which receives the request to read a document permits the user reading of the document 200. The user sets the document 200 on the image reading unit 33, and makes the image reading unit 33 read an image. The document image data thus obtained by reading the document 200 is output via the reading controller 32 and the input/output unit 31 from the scanner 30 to the server 20.

In the server 20, the user-data management unit 22 receives the document image data via the input/output unit 21. The user-data management unit 22 registers (stores) the received document image data as the user image data C in the user-data storage unit 23 in such a manner that the document image data is associated with the corresponding user ID, and the series of processes end.

Figure 12:
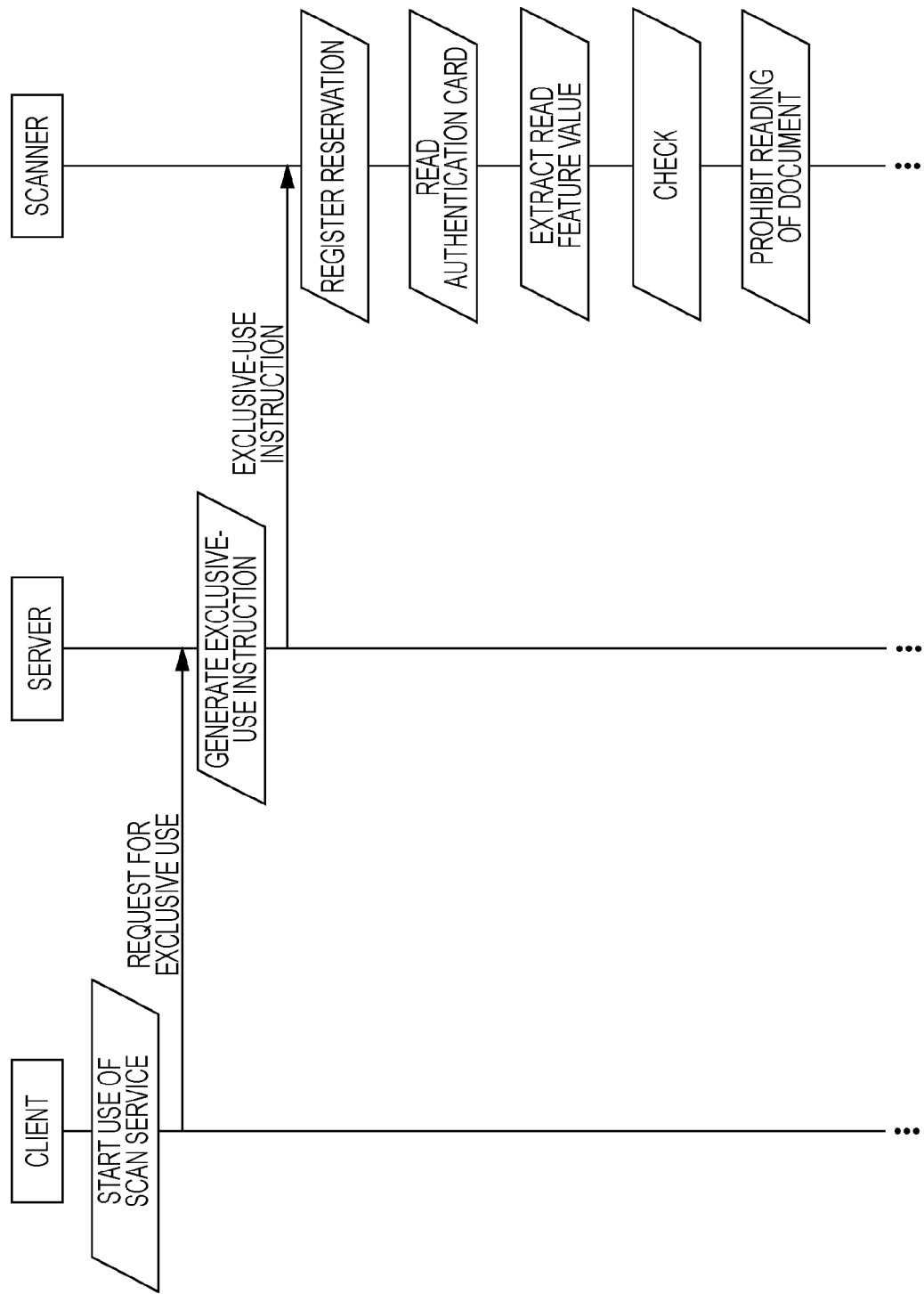
FIG. 12 is a sequence chart for describing an exemplary second operation in the scan service system according to the second exemplary embodiment.

FIG. 12 is a sequence chart for describing an exemplary second operation in the scan service system 1 according to the second exemplary embodiment. FIG. 12 illustrates a case in which a user who has not made a reservation by transmitting a request for exclusive use, or whose reservation made by transmitting a request for exclusive use has been released due to a timeout uses the scanner 30. In the example illustrated in FIG. 12, the procedure until the scanner 30 performs checking is the same as that in the example illustrated in FIG. 11. Therefore, the detail of the procedure will not be described.

If no user feature values in the reservation data match the read feature value, the checking unit 344 outputs an error notification to the reading controller 32. The reading controller 32 which receives the error notification prohibits the user from using the image reading unit 33 to read the document 200, and the series of processes end.

Third Exemplary Embodiment

In the second exemplary embodiment, the scanner 30 itself has a function of setting exclusive-use of the scanner 30. In a third exemplary embodiment, an exclusive-use setting apparatus 50 (see FIG. 13 described below) which has a function of setting exclusive-use is locally connected to the scanner 30 through Universal Serial Bus (USB) or the like. In the third exemplary embodiment, components similar to those in the first or second exemplary embodiment are designated with identical reference numerals, and will not be described in detail. The configuration of the server 20 in the third exemplary embodiment is the same as that described in the second exemplary embodiment (see FIG. 9).

Figure 13:
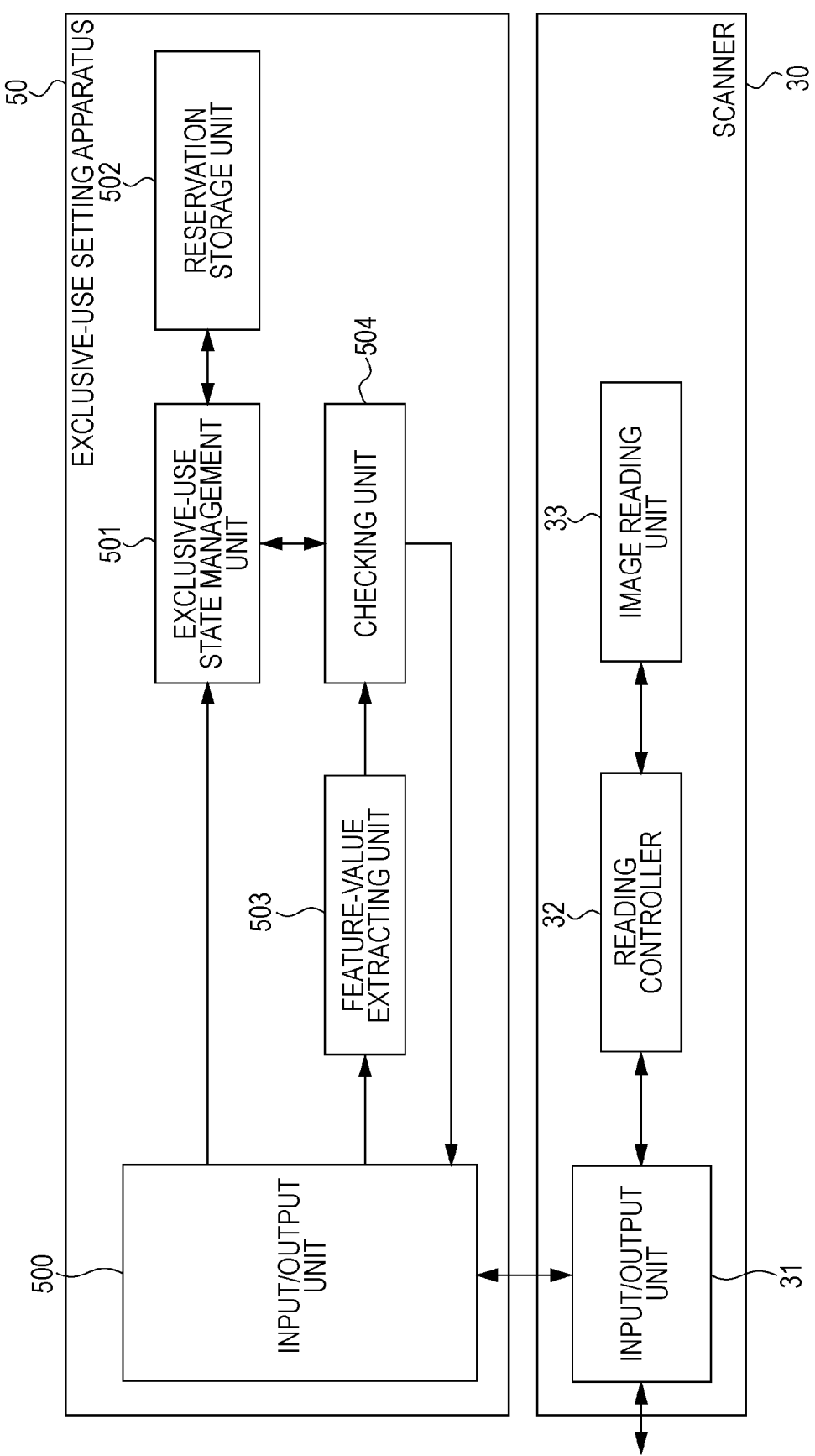
FIG. 13 is a diagram for describing an exemplary configuration of a scanner and an exclusive-use setting apparatus according to a third exemplary embodiment.

FIG. 13 is a diagram for describing the exemplary configuration of the scanner 30 and the exclusive-use setting apparatus 50 according to the third exemplary embodiment.

The general configuration of the scanner 30 according to the third exemplary embodiment is the same as that described in the first exemplary embodiment (see FIG. 3).

The exclusive-use setting apparatus 50 includes an input/output unit 500 which inputs/outputs various types of data between the scanner 30 and the exclusive-use setting apparatus 50, an exclusive-use state management unit 501, a reservation storage unit 502, a feature-value extracting unit 503, and a checking unit 504. Each of the functions of the exclusive-use state management unit 501 to the checking unit 504 is similar to a corresponding one of those of the exclusive-use state management unit 341 to the checking unit 344 in the second exemplary embodiment.

Figure 14:
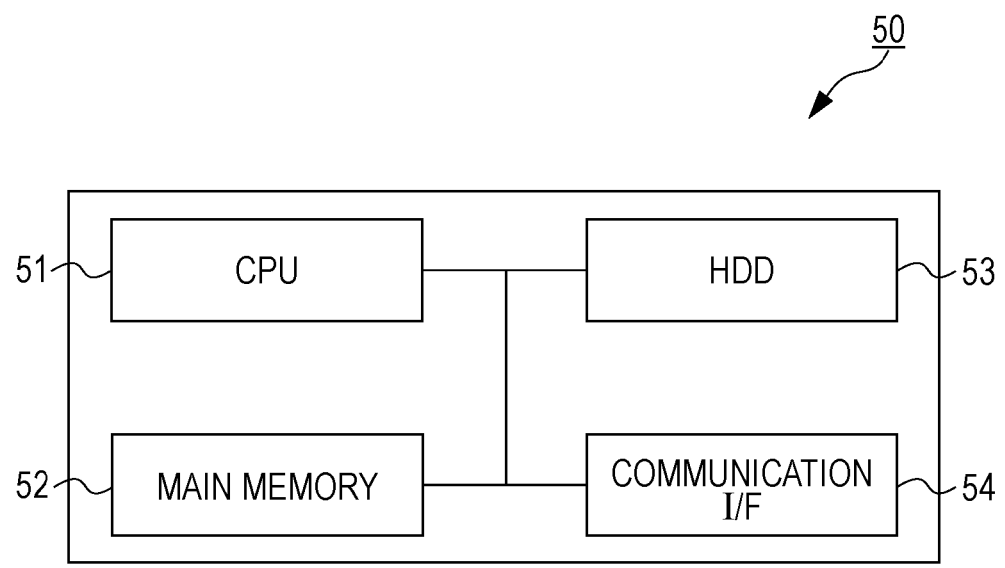
FIG. 14 is a diagram illustrating a hardware configuration of the exclusive-use setting apparatus.

FIG. 14 is a diagram illustrating an exemplary hardware configuration of the exclusive-use setting apparatus 50.

The exclusive-use setting apparatus 50 is implemented by using a computer. As illustrated in FIG. 14, the exclusive-use setting apparatus 50 includes a central processing unit (CPU) 51 which is an arithmetical unit, a main memory 52 which is a storage, and a hard disk drive (HDD) 53. The CPU 51 executes various programs, such as an operating system (OS) and application software. The main memory 52 is a storage area which stores various programs, data used to execute the programs, and the like. The HDD 53 is a storage area which stores input data for various programs, output data from various programs, and the like. The exclusive-use setting apparatus 50 also includes a communication interface (communication I/F) 54 for communicating with the outside. The programs executed by the CPU 51 are stored in the main memory 52 in advance. In addition, for example, the programs may be provided for the CPU 51 by storing them in a recording medium such as a compact disc-read-only memory (CD-ROM), or may be provided for the CPU 51 through the network 40 (see FIG. 1).

The exclusive-use setting unit 25 included in the server 20 in the first exemplary embodiment or the exclusive-use setting unit 34 included in the scanner 30 in the second exemplary embodiment has a hardware configuration similar to that of the exclusive-use setting apparatus 50 illustrated in FIG. 14. The details about this are not described.

Figure 15:
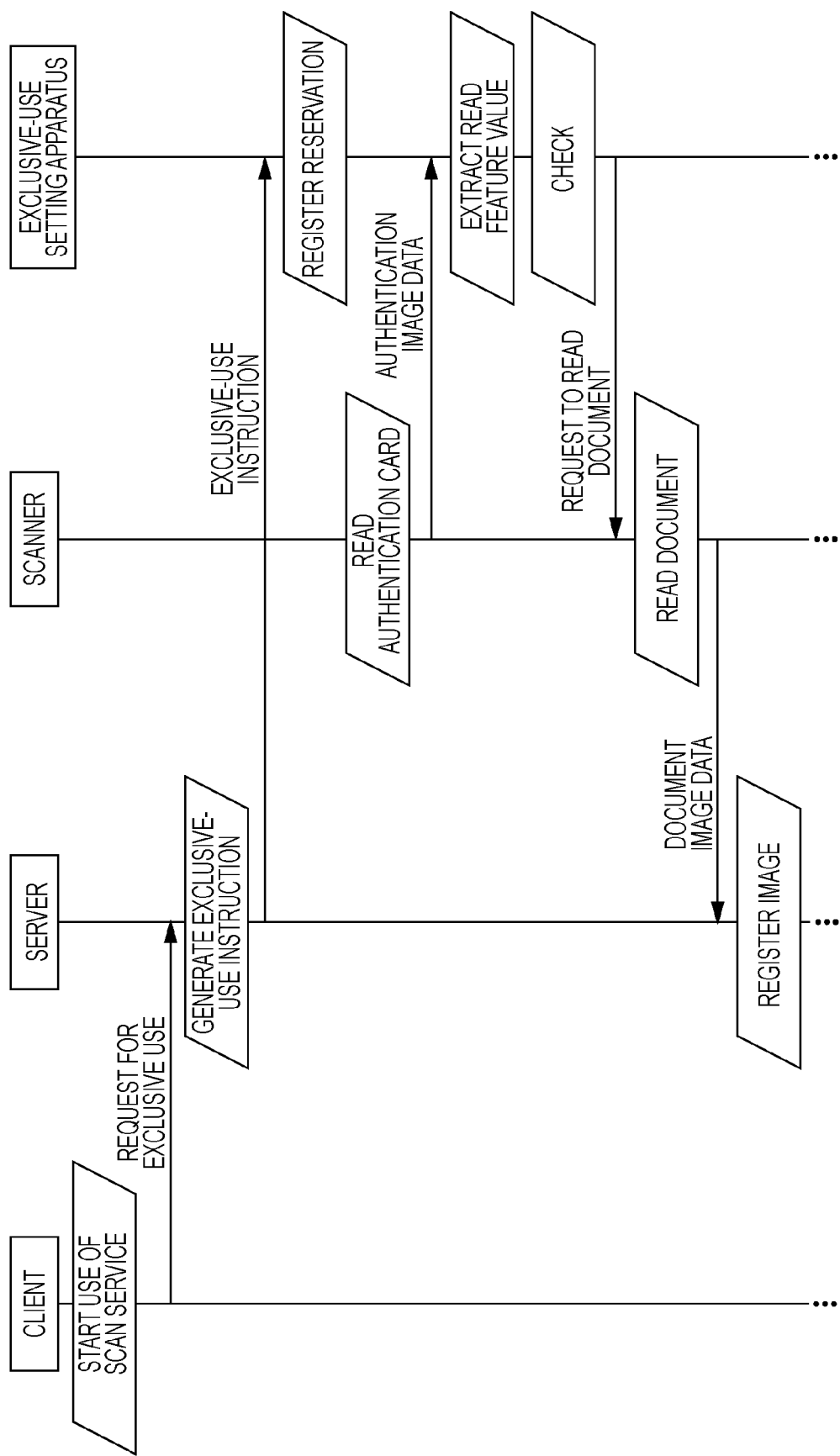
FIG. 15 is a sequence chart for describing an exemplary first operation in the scan service system according to the third exemplary embodiment.

FIG. 15 is a sequence chart for describing an exemplary first operation in the scan service system 1 according to the third exemplary embodiment. FIG. 15 illustrates a case in which a user who has made a reservation by transmitting a request for exclusive use uses the scanner 30 before a timeout occurs in a timer using the remaining time.

In one of the clients constituting the client group 10, a user opens a web browser corresponding to the scan service, thereby starting use of the scan service. Then, the user transmits a request for exclusive use of the scanner 30 on the web browser, whereby the request for exclusive use is output from the client to the server 20. The request for exclusive use includes the user ID of the user who has transmitted the request.

In the server 20, the exclusive-use instruction generating unit 24 receives the request for exclusive use via the input/output unit 21. Then, the exclusive-use instruction generating unit 24 obtains the user ID included in the received request for exclusive use, and transmits the obtained user ID to the user-data management unit 22. The user-data management unit 22 refers to the user data stored in the user-data storage unit 23, and reads out the user feature value (the entire user feature value A and the partial user feature value B) corresponding to the user ID. The user-data management unit 22 transmits the user feature value corresponding to the user ID, back to the exclusive-use instruction generating unit 24. The exclusive-use instruction generating unit 24 generates an exclusive-use instruction in which the user ID included in the request for exclusive use is associated with the user feature value received from the user-data management unit 22, and outputs it via the input/output unit 21 from the server 20 to the scanner 30.

In the scanner 30, the input/output unit 31 receives the exclusive-use instruction. The input/output unit 31 transfers the received exclusive-use instruction to the exclusive-use setting apparatus 50.

In the exclusive-use setting apparatus 50, the exclusive-use state management unit 501 receives the exclusive-use instruction via the input/output unit 500. The exclusive-use state management unit 501 registers the exclusive-use instruction as reservation data in the reservation storage unit 502, and starts countdown of the remaining time by using a timer.

The user who has transmitted the exclusive-use instruction via the client goes to the scanner 30, sets the authentication card 100 carried by the user himself/herself, on the image reading unit 33, and makes the image reading unit 33 read an image, whereby the obtained authentication image data is output. The image reading unit 33 outputs the authentication image data via the reading controller 32 and the input/output unit 31 from the scanner 30 to the exclusive-use setting apparatus 50.

In the exclusive-use setting apparatus 50, the feature-value extracting unit 503 receives the authentication image data via the input/output unit 500. The feature-value extracting unit 503 extracts a feature value from the received authentication image data, and obtains a read feature value including an entire read feature value a based on the entire area 100a and a partial read feature value b based on the specified area 100b. The feature-value extracting unit 503 transmits the obtained read feature value to the checking unit 504.

The checking unit 504 transmits an inquiry to the exclusive-use state management unit 501. The exclusive-use state management unit 501 transmits reservation data stored in the reservation storage unit 502 back to the checking unit 504. The checking unit 504 checks the read feature value received from the feature-value extracting unit 503 against the reservation data (user feature values) received from the exclusive-use state management unit 501, and determines whether or not a user feature value matches the read feature value.

If a user feature value in the reservation data matches the read feature value, the checking unit 504 outputs a request to read a document, via the input/output unit 500 from the exclusive-use setting apparatus 50 to the scanner 30.

In the scanner 30, the reading controller 32 receives the request to read a document via the input/output unit 31. The reading controller 32 which receives the request to read a document permits the user reading of the document 200. The user sets the document 200 on the image reading unit 33, and makes the image reading unit 33 read an image. The document image data thus obtained by reading the document 200 is output via the reading controller 32 and the input/output unit 31 from the scanner 30 to the server 20.

In the server 20, the user-data management unit 22 receives the document image data via the input/output unit 21. The user-data management unit 22 registers (stores) the received document image data as the user image data C in the user-data storage unit 23 in such a manner that the document image data is associated with the corresponding user ID, and the series of processes end.

Figure 16:
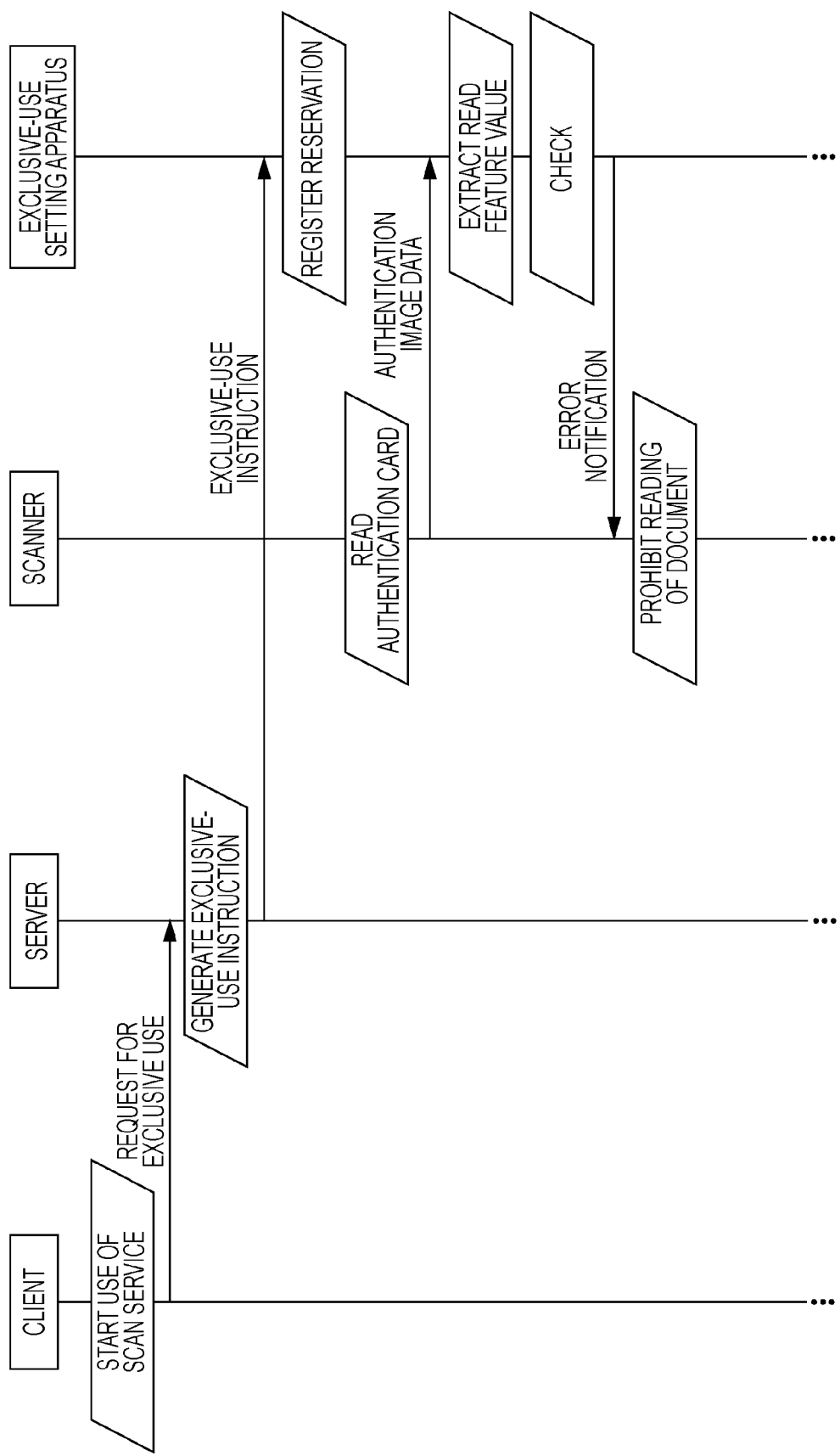
FIG. 16 is a sequence chart for describing an exemplary second operation in the scan service system according to the third exemplary embodiment.

FIG. 16 is a sequence chart for describing an exemplary second operation in the scan service system 1 according to the third exemplary embodiment. FIG. 16 illustrates a case in which a user who has not made a reservation by transmitting a request for exclusive use, or whose reservation made by transmitting a request for exclusive use has been released due to a timeout uses the scanner 30. In the example illustrated in FIG. 16, the procedure until the exclusive-use setting apparatus 50 performs checking is the same as that in the example illustrated in FIG. 15. Therefore, the detail of the procedure will not be described.

If no user feature values in the reservation data match the read feature value, the checking unit 504 outputs an error notification via the input/output unit 500 from the exclusive-use setting apparatus 50 to the scanner 30.

In the scanner 30, the reading controller 32 receives the error notification via the input/output unit 31. The reading controller 32 which receives the error notification prohibits the user from using the image reading unit 33 to read the document 200, and the series of processes end.

According to the first to third exemplary embodiments, the description is made by taking the case in which the scan service system 1 is implemented as a so-called server-client system, as an example. However, the scan service system 1 is not limited to this. The scan service system 1 may be implemented as a so-called cloud computing system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
a first-information acquiring section that acquires first image information which is read by an image acquiring apparatus;
a transmitting section that, in response to the first image information which is acquired by the first-information acquiring section and which indicates that the image acquiring apparatus is permitted to perform a reading operation, transmits instruction information to the image acquiring apparatus, the instruction information indicating that the image acquiring apparatus be permitted to perform the reading operation;
a second-information acquiring section that acquires second image information which is read by the image acquiring apparatus in accordance with the instruction information; and
a storage that stores the second image information in association with the first image information.

2. The information processing apparatus according to claim 1, wherein the processor is further configured to execute:
a feature-value extracting section that extracts a feature value from the first image information acquired by the first-information acquiring section so as to obtain image feature value information; and
a determination section that determines whether or not the reading operation performed by the image acquiring apparatus is to be permitted on a basis of the image feature value information extracted by the feature-value extracting section.

3. The information processing apparatus according to claim 2, wherein the processor is further configured to execute:
a reserving section that reserves the image acquiring apparatus for use in such a manner that user identification information provided for a user who wants to perform the reading operation on a document by using the image acquiring apparatus is associated with user feature value information obtained by extracting a feature value from an image of a medium for identification which is unique to the user;
a checking section that checks the image feature value information extracted by the feature-value extracting section against the user feature value information in the reservation for use which is made by the reserving section; and
a prohibiting section that, when the user feature value information does not match the image feature value information in the checking performed by the checking section, causes the transmitting section to transmit the instruction information indicating that the reading operation performed by the image acquiring apparatus on the document be prohibited.

4. The information processing apparatus according to claim 3,
wherein the reserving section starts measuring of a predetermined restriction time when the reservation for use is started, and deletes the reservation after the restriction time elapses.

5. The information processing apparatus according to claim 1, wherein the first image information comprises an image.

6. The information processing apparatus according to claim 1, wherein the first image information comprises a first image, and the second image information comprises a second image.

7. The information processing apparatus according to claim 1, wherein the second image information comprises an image captured by the image acquiring apparatus.

8. The information processing apparatus according to claim 1, wherein the first image information comprises an image of an identification device.

9. The information processing apparatus according to claim 1, wherein the image acquiring apparatus is a scanner.

10. An image reading system comprising:
an image acquiring section that reads an image formed on a recording medium;
a first-information acquiring section that acquires first image information which is read by the image acquiring section;
a transmitting section that, in response to the first image information which is acquired by the first-information acquiring section and which indicates that the image acquiring section is permitted to perform a reading operation, transmits instruction information to the image acquiring section, the instruction information indicating that the image acquiring section be permitted to perform the reading operation;

a second-information acquiring section that acquires second image information which is read by the image acquiring section in accordance with the instruction information; and a storage that stores the second image information in association with the first image information.

11. The image reading system according to claim 10, wherein the image acquiring section is a scanner.

12. A non-transitory computer readable medium storing a program causing a computer to execute a process comprising:

acquiring first image information which is read by an image acquiring apparatus;

in response to the acquired first image information indicating that the image acquiring apparatus is permitted to perform a reading operation, transmitting instruction information to the image acquiring apparatus, the instruction information indicating that the image acquiring apparatus be permitted to perform the reading operation;

acquiring second image information which is read by the image acquiring apparatus in accordance with the instruction information; and storing the second image information in association with the first image information.

13. The process according to claim 12, wherein the image acquiring apparatus is a scanner.

* * * * *